3,585,005
LIQUID-LIQUID CONTACTOR HAVING OPPOSING SURFACES OF DIFFERENT WETTING CHARACTERISTICS
George Christopher Coggan, Nottingham, England, assignor to National Research Development Corporation, London, England
Filed Mar. 11, 1969, Ser. No. 806,153
Int. Cl. B01d 11/04, 1/22
U.S. Cl. 23—267                                    7 Claims

ABSTRACT OF THE DISCLOSURE

A contactor comprising a hollow member through which in operation immiscible or partially miscible fluid phases are arranged to flow, and within the hollow member at least one surface which is preferentially wetted by one of the phases and which is so arranged that during passage through the contactor substantially all of that phase flows on the surface in the form of a film.

Figure 1:
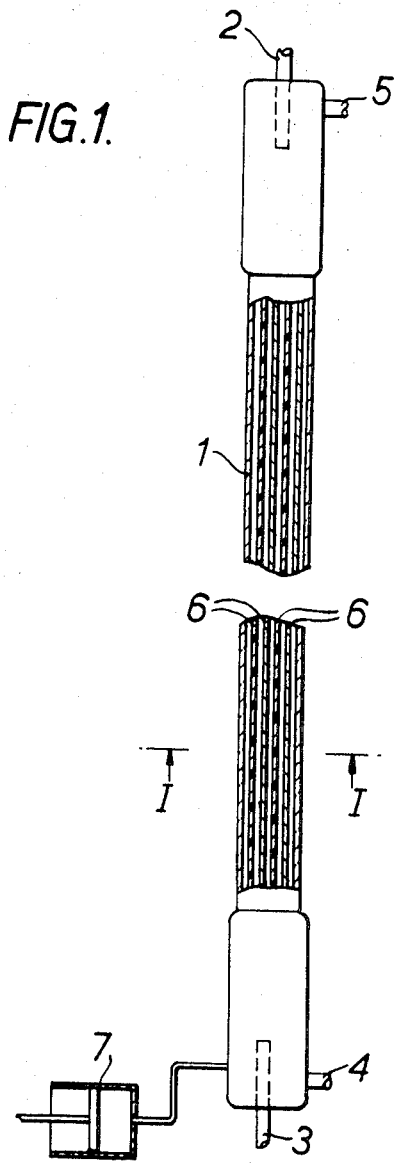

A contactor which comprises a pair of surfaces of opposite wetting characteristics, the physical separation of which is so arranged as to promote flow of the immiscible or partially miscible fluid phases on the surfaces in the form of films which are in contact with each other.

---

This invention relates to contactors and in particular to a contactor for contacting immiscible or partially miscible fluid phases.

A variety of contacting devices have been proposed in the past for the purpose of achieving mass transfer or heat transfer between immiscible or partially miscible fluid phases. However it has previously been found difficult to produce a contactor having a large throughput in which disengagement of the phases at each end of the contactor is rapid. Entrainment of secondary haze, produced when one fluid is dispersed as droplets in another, also can reduce substantially the effectiveness of conventional contactors. Furthermore the processing of solutions containing solid particles has often been found difficult in conventional contactors due to the formation of blockages which restrict flow.

According to the present invention there is provided a contactor comprising a hollow member through which in operation immiscible or partially miscible fluid phases are arranged to flow, and within the hollow member at least one surface which is preferentially wetted by one of the phases, and which is so arranged that during passage through the contactor substantially all of that phase flows on the surface in the form of a film. The surface may comprise an inner surface of the hollow member, or a surface of an element positioned within the hollow member.

Also included within the scope of the invention is a process for contacting immiscible or partially miscible fluid phases which comprises passing the fluid phases over at least one surface which is preferentially wetted by one of the phases and on which substantially all of that phase is arranged to flow in the form of a film.

A contactor according to the invention may comprise a pair of surfaces of opposite wetting characteristics, the physical separation of which is so arranged as to promote flow of the immiscible or partially miscible fluid phases on the surfaces in the form of films which are in contact with each other. In many cases it is preferred to use a plurality of such pairs of surfaces. Alternatively a contactor may comprise a plurality of surfaces of similar wetting characteristics which are arranged so that one of the phases flows along the surfaces in the form of a film.

Contactors according to the present invention are particularly applicable where the fluid phases are immiscible or partially miscible liquids, although a system in which one of the fluid phases is a gas or vapour can also be used.

Preferably, the fluid phases are arranged to flow countercurrently and if one phase is lighter than the other this can be conveniently arranged by so arranging the contactor that the surfaces are vertical and introducing the lighter phase at the bottom of the contactor and the heavier phase at the top. The hollow member may, for example, be in the form of a vertical column enclosing the surfaces, having an inlet and outlet at the top for introduction of the heavier phase and removal of the lighter phase, and an inlet and outlet at the bottom for introduction of the lighter phase and removal of the heavier phase.

Figure 2:
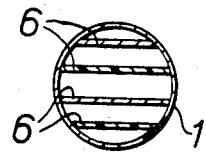

A specific example of a contactor according to the invention having a plurality of elements having surfaces of opposite wetting characteristics will now be described with reference to the accompanying drawings in which:

FIG. 1 represents a side elevation of the contactor; and FIG. 2 represents a section taken along the line I—I of FIG. 1.

The contactor comprises a vertical glass tube 1, 2.0 inches in diameter, having phase entry ports 2 and 3 and exit ports 4 and 5. Arranged within the glass tube are a number of vertically-arranged plates 6 made alternately of glass and PTFE coated stainless steel. The plates are arranged 0.171 inch apart from each other. The contactor is provided with a hydraulic pulsing unit 7.

In operation, the lighter phase is introduced at the bottom of the contactor and the heavier phase at the top. The heavier phase is drawn off from the bottom of the contactor and the lighter phase from the top. When a steady state is reached, each of the phases flows as a film along the surfaces that are wetted by that phase so that the two phases flow countercurrently and in contact with each other.

There is an optimum distance apart of the surfaces for any pair of immiscible or partially miscible fluid phases. This is usually below 2 inches apart, particularly between 0.008 and 1.6 inch apart, for example, 0.171 inch apart.

The column can have any convenient cross-section and it can, for example, be circular as shown in the accompanying drawings, square or polygonal. The column need not be vertical and it can, for example, be inclined at an angle to the vertical.

Various arrangements of elements can be used although they are preferably disposed in parallel and so arranged that their adjacent surfaces have opposite wetting characteristics. They can consist of flat plates as shown in the accompanying drawings, or a series of banks of flat plates, the plane of each bank being turned through 90° in comparison with the previous bank. Another arrangement consists of vertical flat plates with baffles, containing holes, set between them at an angle to the vertical to direct the fluids towards the surface which they wet preferentially. Alternatively, the elements can consist of concentric tubes of increasing diameter, or a plurality of spaced apart parallel rods.

The wetting characteristics of a surface is expressed quantitatively in terms of advancing and receding contact angles. For any given pair of fluids the advancing and receding contact angles for one of the fluids in the presence of the other are $\theta A$ and $\theta R$ respectively. If $\theta A1$ and $\theta R1$ are the said angles for one of the fluids on one of the surfaces and $\theta A2$ and $\theta R2$ are the said angles for the same fluid on the other surface then the wetting term $W12$ is defined as follows:

$$W12 = \cos \theta A1 - \cos \theta R1 - \cos \theta A2 + \cos \theta R2$$

Preferably, the W12 should be as large as possible and suitably at least 0.5, preferably between 2 and 4, such as for example about 3. Suitable elements for aqueous phases may be made from hydrophilic materials such as glass, stainless steel, vitreous enamel, or Phosphor bronze.

Suitable elements for oleaginous phases may be made from hydrophobic materials, for example, plastic materials such as polytetrafluorethylene and polyethylene and carbon.

In use, the contactor can, if desired, be subjected to regular upward and downward pulsation from a hydraulic pulsing unit.

The invention is illustrated by the following examples:

EXAMPLE 1

This example describes the transfer of propionic acid from tri-n-butyl phosphate in kerosene to a water phase, using a column of circular cross-section.

The column used is as shown in the accompanying drawings, having a height of 4 feet, a diameter of two inches and strips of stainless steel and polytetrafluorethylene coated stainless steel arranged 0.171 inch apart. A 20% by volume solution of tri-n-butyl phosphate (TBP) in odourless kerosene and containing 0.692 gm. mol of propionic acid per litre was fed into the bottom of the column and deionised water saturated with TBP into the top. The column was pulsed by a hydraulic pulsing unit at a frequency of 0.5 cycle/sec. and with an amplitude of 0.32 foot. The total superficial throughput based on the cross-sectional area of the empty column was 671 feet per hour and the height of a transfer unit for the TBP phase was 6.0 ft.

EXAMPLE 2

This example describes the transfer of propionic acid from tri-n-butyl phosphate in kerosene to a water phase using a column of square cross-section.

The column used was as shown in the accompanying drawings except that it was of square cross-section. The column was 4 feet high and had a side of 1.75 inch. Strips alternately of glass and polytetrafluorethylene-coated were arranged inside the column 0.112 inch apart.

A 20% by volume solution of TBP in odourless kerosene containing 0.284 gm. mol of propionic acid per litre was fed into the bottom of the column and deionised water saturated with TBP into the top. The column was pulsed by a hydraulic pulsing unit at a frequency of 1.5 cycles/sec. and with an amplitude of 0.38 foot. The total superficial throughput based on the cross-sectional area of the empty column was 400 feet per hour at a 1:1 flow ratio and the height of a transfer unit was 6.2 ft.

EXAMPLE 3

This example describes the transfer of acetic acid from methyl iso-butyl carbinol to a water phase using a column of rectangular cross-section.

The column used is 4 feet high and has sides of 1.75 inch and 0.660 inch. Strips alternately of glass and polytetrafluorethylene-coated stainless steel are arranged inside the column 0.171 inch apart and with their surfaces parallel to each other and to the side of length 1.75 inch. There are four strips, one against each wall and two in between giving three gaps and the cross-sectional area of the column left free for occupation by liquids is 0.897 in.². A solution of methyl iso-butyl carbinol containing 0.396 gm. mol of acetic acid per litre is fed into the bottom of the column and deionised water saturated with methyl iso-butyl carbinol fed into the top. When the column is pulsed by a hydraulic pulsing unit at a frequency of 1.5 cycles/sec. and with an amplitude of 0.227 ft. and the feed rates of the two phases are both 1.45 ft.³/hr. the height of a transfer unit is 5.3 ft. In this example the liquids are processed at the rate of approximately 1 ton/day of each phase through a free cross-sectional area in the contacting section of less than one square inch.

EXAMPLE 4

The contactor used in this example is exactly as described in Example 3 except that the liquids are not pulsed. No power is supplied to the contactor. The methyl iso-butyl carbinol feed contains 0.259 gm. mol acetic acid per litre. The feed rates of the two phases are both 1.23 ft.³/hr. and the height of a transfer unit is 9.6 ft.

I claim:

1. In an apparatus for contacting a first liquid with a second liquid, said first and second liquids heaving different surface wetting characteristics and being at most only partially miscible with each other, said apparatus comprising a substantially vertical column defining an elongated contacting area having a plurality of substantially vertical plates therein defining a plurality of flow paths therethrough, the improvement wherein the adjacent plates defining each of said flow paths have their opposing surfaces of first and second wettable surface means, said first wettable surface means being preferentially wetted by said first liquid and said second wettable surface means being preferentially wetted by said second liquid, said first and second wettable surface means being physically separated along their length by from .008 to 1.6 inches so as to promote flow of said first and second liquids in the form of films, with said films being simultaneously in contact with each other, and with surfaces of the first and second wettable surface means respectively.

2. An apparatus as claimed in claim 1 including hydraulic pulsing means to subject the liquid films to a regular forward and backward pulsation.

3. An apparatus as claimed in claim 1 wherein the plurality of substantially vertical plates are concentric cylinders.

4. An apparatus as claimed in claim 1 wherein the plurality of substantially vertical plates are concentric rectangular ducts.

5. An apparatus as claimed in claim 1 wherein said column is circular in cross section.

6. An apparatus as claimed in claim 1 wherein said column is rectangular in cross section.

7. An apparatus as claimed in claim 1 wherein the first wettable surface means have a surface of a member selected from the group consisting of glass, stainless steel, vitreous enamel and phosphor bronze and said second wettable surface means have a surface of a member selected from the group consisting of polytetrafluoroethylene, polyethylene and carbon.

References Cited

UNITED STATES PATENTS

| | | | |
|---|---|---|---|
| 2,089,945 | 8/1937 | Converse | 159—13 |
| 2,265,762 | 12/1941 | McKittrick | 23—267X |
| 2,258,982 | 10/1941 | Gordon | 23—270.5 |
| 2,662,001 | 12/1953 | Burns | 23—267X |
| 2,705,594 | 4/1955 | Brewer | 23—270.5X |
| 2,743,170 | 4/1956 | Burger | 23—267X |
| 2,944,966 | 7/1960 | Eickmeyer | 23—270.5X |
| 3,004,590 | 10/1961 | Rosenblad | 159—13 |
| 3,033,541 | 5/1962 | Belkin | 261—112 |
| 3,044,993 | 7/1962 | Tiemersma | 23—270.5X |
| 3,108,859 | 10/1963 | Koski | 23—310 |
| 3,154,390 | 10/1964 | Goren | 23—309 |
| 3,351,434 | 11/1967 | Grimes | 23—310 |

WILBUR L. BASCOMB, JR., Primary Examiner

S. J. EMERY, Assistant Examiner

U.S. Cl. X.R.

23—270.5, 301, 310; 116—14.52; 159—13; 261—112

UNITED STATES PATENT OFFICE
CERTIFICATE OF CORRECTION

Patent No. 3,585,005      Dated June 15, 1971

Inventor(s) George Christopher Coggan

It is certified that error appears in the above-identified patent and that said Letters Patent are hereby corrected as shown below:

Priority based on United Kingdom Application No. 12715/68, filed March 18, 1968.

Signed and sealed this 26th day of October 1971.

(SEAL)
Attest:

EDWARD M. FLETCHER, JR.
Attesting Officer

ROBERT GOTTSCHALK
Acting Commissioner of Patents